United States Patent
Koenig et al.

(10) Patent No.: US 10,472,458 B2
(45) Date of Patent: **\*Nov. 12, 2019**

(54) STABILIZER FOR POLYMER POLYOL PRODUCTION PROCESSES

(71) Applicant: BASF SE, Ludwigshafen (DE)

(72) Inventors: Christian Koenig, Mannheim (DE); Dejan Petrovic, Osnabrueck (DE)

(73) Assignee: BASF SE, Ludwigshafen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/307,242

(22) PCT Filed: Apr. 28, 2015

(86) PCT No.: PCT/EP2015/059148
§ 371 (c)(1),
(2) Date: Oct. 27, 2016

(87) PCT Pub. No.: WO2015/165878
PCT Pub. Date: Nov. 5, 2015

(65) Prior Publication Data
US 2017/0051097 A1    Feb. 23, 2017

(30) Foreign Application Priority Data
Apr. 30, 2014   (EP) .................... 14166528

(51) Int. Cl.
| | | |
|---|---|---|
| *C08F 283/06* | (2006.01) | |
| *C08F 290/06* | (2006.01) | |
| *C08G 18/08* | (2006.01) | |
| *C08G 18/48* | (2006.01) | |
| *C08G 18/63* | (2006.01) | |
| *C08G 18/70* | (2006.01) | |
| *C08G 18/71* | (2006.01) | |
| *C08L 75/04* | (2006.01) | |

(52) U.S. Cl.
CPC .......... *C08G 18/636* (2013.01); *C08F 283/06* (2013.01); *C08F 290/062* (2013.01); *C08G 18/0876* (2013.01); *C08G 18/4829* (2013.01); *C08G 18/632* (2013.01); *C08G 18/702* (2013.01); *C08G 18/71* (2013.01); *C08L 75/04* (2013.01)

(58) Field of Classification Search
CPC .............. C08G 18/636; C08G 18/4829; C08G 18/632; C08G 18/702; C08G 18/71; C08G 18/0876; C08F 283/06; C08F 290/062; C08L 75/04
See application file for complete search history.

(56) References Cited

U.S. PATENT DOCUMENTS

| | | | |
|---|---|---|---|
| 5,196,476 A | 3/1993 | Simroth | |
| 5,814,699 A | 9/1998 | Kratz et al. | |
| 5,990,185 A | 11/1999 | Fogg | |
| 6,013,731 A | 1/2000 | Holeschovsky et al. | |
| 6,623,827 B2 | 9/2003 | Schottland et al. | |
| 2001/0025093 A1* | 9/2001 | Ishizaki | C08J 3/12 526/210 |
| 2006/0083694 A1* | 4/2006 | Kodas | B01J 13/0043 424/46 |
| 2007/0060690 A1 | 3/2007 | Adkins et al. | |
| 2009/0242847 A1* | 10/2009 | Hosoya | G02F 1/167 252/500 |
| 2009/0281206 A1* | 11/2009 | Van der Wal | C08F 283/06 521/170 |
| 2013/0281627 A1 | 10/2013 | England et al. | |
| 2017/0044297 A1* | 2/2017 | Koenig | C08G 18/633 |
| 2018/0009956 A1* | 1/2018 | Koenig | C08G 18/636 |

FOREIGN PATENT DOCUMENTS

| | | |
|---|---|---|
| EP | 0 786 480 A1 | 7/1997 |
| EP | 1 506 240 A0 | 2/2005 |
| EP | 1 675 885 A0 | 7/2006 |
| WO | WO 02/28937 A2 | 4/2002 |
| WO | WO 2005/003200 A1 | 1/2005 |
| WO | WO 2009/155427 A2 | 12/2009 |
| WO | WO 2012/154393 A2 | 11/2012 |

OTHER PUBLICATIONS

International Search Report and Written Opinion dated Jun. 30, 2015 in PCT/EP2015/059148.
International Preliminary Report on Patentability dated Mar. 29, 2016 in PCT/EP2015/059148.
Office Action dated Jul. 19, 2017, in European Patent Application No. 15717925.0 filed Apr. 28, 2015.
M. Ionescu, "Chemistry and Technology of Polyols for Polyurethanes", Rapra Technology Limited, p. 197 (2005).

\* cited by examiner

*Primary Examiner* — Patrick D Niland
(74) *Attorney, Agent, or Firm* — Oblon, McClelland, Maier & Neustadt, L.L.P.

(57) ABSTRACT

This invention relates to a stabilizer for polymer polyol production processes, its production and use.

13 Claims, 1 Drawing Sheet

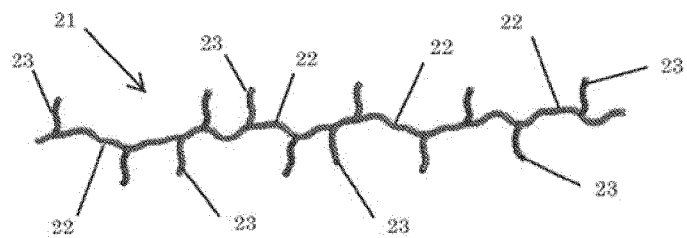

STABILIZER FOR POLYMER POLYOL PRODUCTION PROCESSES

This invention relates to a stabilizer for polymer polyol production processes, its production and use.

In particular, the inventive stabilizer is appropriate for the stabilization of polymer polyol dispersions produced by melt emulsification.

In this context, the term "melt emulsification" refers to a process which involves only physical mixing of the components, rather than a chemical reaction.

The term melt emulsification is defined in WO2009/155427 as follows:

Another way of dispersion the previously-formed polymer is to melt it, and then blend the molten polymer with the polyol under shear. The shearing action breaks the molten polymer into small droplets which become dispersed in the polyol phase. This process is described in U.S. Pat. No. 6,623,827. That patent describes a process wherein a previously-formed polymer is melted in an extruder, mixed with a surfactant and a polyether polyol, and subsequently mixed with more of with the polyether polyol. The mixture is then cooled to solidify the particles.

The term stabilizer may be defined as a compound obtained by reacting a macromere containing reactive unsaturation with styrene and acrylonitrile in a polyether polyol, optionally a chain transfer agent can be used. The inventive stabilizers are used for preparing polymer polyols containing small particles with D50 of below 25 µm, preferably below 10 µm, most preferably below 5 µm, via melt emulsification process and should be able to stabilize the polymer polyol dispersion for a prolonged period of time (prevention of phase separation).

The stabilizing effect is determined by storing samples for a prolonged time and visually inspecting them before and after the storage period of, usually, six months. When no precipitation has been formed at the bottom of the sample container (i. e. no phase separation), the sample is considered to be stable and thus, the stabilizer works.

The inventive stabilizers are inherently different from preformed stabilizers used for standard graft process via free radical polymerization described in EO1675885, U.S. Pat. Nos. 6,013,731, 5,990,185 or EP0786480. Requirements and challenges for the process to form and stabilizer polymer polyol dispersions via radical polymerization are fundamentally different.

EP 1 506 240 A0 discloses graft polyols prepared by a continuous process. The process is a standard process using radical polymerization to arrive at the final polymer polyol product. Thus, since the described process is not a melt emulsification process, the stabilizer of EP 1 506 240 A0 is different from a stabilizer useful for melt emulsification processes. A low amount of macromere (16% based on TMI and polyether polyol) is used, resulting in inferior properties (no efficient phase stabilization).

WO2012154393 describes a polymeric stabilizer which is produced by copolymerizing an unsaturated polyether with low molecular weight monomers in a controlled radical polymerization. This polymeric stabilizer is used for producing polymer polyol products via a mechanical dispersion process or an in situ polymerization process. Stabilizers obtained by a free radical polymerization have a larger variability in their structure compared to stabilizer obtained by controlled radical polymerization. Stabilizers produced by free radical polymerization and controlled radical polymerization are fundamentally different. Molecular weight distributions, side products, molecular weight and so on are highly different. Even products with similar compositions obtained by these two processes are not comparable.

In contrast to WO2012154393, this invention describes, inter alia, the synthesis of a stabilizer obtained by free radical polymerization of a macromere which is used for a free radical polymerization. This product is used in a melt emulsification process in order to obtain polymer polyol products which contain styrene acrylonitrile copolymer as a dispersed phase.

One aspect of this invention is to synthesize stabilizers that effectively stabilize dispersions of styrene acrylonitrile copolymers in a polyether phase. It could be shown that dispersions obtained by using these stabilizers obtained by this method have small particle sizes and offer an improved long time stability.

It could be shown that the composition of the inventive stabilizers is important for the stabilizing effect. Surprisingly, the ratio between the monomer styrene and acrylonitrile does not necessarily have to match the ratio of the used SAN material to obtain stable dispersion.

Thus, the object of the present invention is a stabilizer (S), preferably useful for melt emulsification processes to manufacture polymer polyols, comprising from 10 to 70% by weight, preferably 30 to 60% by weight, more preferably 40 to 55% by weight, based on the sum of all components, at least one polyol P2, and at least one polyol CSP which comprises the reaction product of at least one macromere M, styrene and acrylonitrile in P2, optionally with an initiator and/or a chain transfer agent, wherein the content of macromere M of the stabilizer (S) is between 30-70 wt %, preferably 35 to 54 wt %, based on the sum of all components, and/or wherein the polyol CSP is preferably comb-structured In this disclosure, the term "stabilizer" (S) refers, in a general sense, to a chemical compound.

The stabilizer (S) is a compound that is assumed to stabilize dispersions of styrene acrylonitrile copolymers in a polyether phase, and thus is assumed to stabilize polymer polyol dispersions.

In particular, the stabilizer (S) is assumed to stabilize polymer polyol dispersions obtained by melt emulsification processes.

Further objects of this invention are also a process for the production of inventive stabilizer (S) by free radical polymerization of styrene, acrylonitrile and at least one macromere M in the presence of at least one polyol P2, and a process for the production of a polymer polyol dispersion by melt emulsification, wherein the inventive stabilizer (S) is used.

The polyol P2 is usually selected from polyether polyols (PEOLs), preferably from the group consisting of PEOLs with a molecular weight Mn between 1000 and 6000 g/mol, more preferably selected from the group consisting of PEOLs with a molecular weight between 2000 and 5000 g/mol. Mn may be determined as described below.

WO 2002/28937 describes stabilizers used in stable dispersions for PU applications. These stabilizers are described as preferably essentially free of functionalities. In contrast to this publication, the inventive stabilizers described herein contain OH-functionalities that should increase the storage stability of the obtained dispersions by interacting with the used carrier polyols. Furthermore, OH-functionalities of the stabilizer will interact with the isocyanate during the PU reaction and will lead to an improved embedding of the SAN particles in the PU matrix.

As mentioned above, in a preferred embodiment the polyols CSP contained in the inventive stabilizers are comb-structured.

In this preferred comb-structure, the typical distance between two macromeres is between 16 units styrene and acrylonitrile up to 500 units of styrene and acrylonitrile, preferentially 30 units styrene and acrylonitrile up to 200 units of styrene and acrylonitrile.

FIG. 1 illustrates an exemplary embodiment of a comb-structured polyol CSP (21), which is a component of a preferred embodiment of an inventive stabilizer (S), wherein (22) refers to the copolymer chain composed of styrene and acrylonitrile and (23) denotes the macromere units.

EP 1 675 885 gives a definition of the term preformed stabilizers:

A pre-formed stabilizer (PFS) is particularly useful for preparing a polymer polyol having a lower viscosity at a high solid content. In the pre-formed stabilizer processes, a macromere is reacted with monomers to form a co-polymer of composed of macromere and monomers. These co-polymers comprising a macromere and monomers are commonly referred to as pre-formed stabilizers (PFS). Reaction conditions may be controlled such that a portion of the co-polymer precipitates from solution to form a solid. In many applications, a dispersion having a low solids content (e.g., 3 to 15% by weight) is obttained. Preferably, the reaction conditions are controlled such that the particle size is small, thereby enabling the particles to function as "seeds" in the polymer polyol reaction.

For example, U.S. Pat. No. 5,196,476 discloses a pre-formed stabilizer composition prepared by polymerizing a macromere and one or more thylenically unsaturated monomers in the presence of a free-radical polymerization initiator and a liquid diluent in which the pre-formed stabilizer is essentially insoluble. EP 0,786,480 discloses a process for the preparation of a pre-formed stabilizer by polymerizing, in the presence of a free-radical initiator, from 5 to 40% by weight of one or more ethylenically unsaturated monomers in the presence of a liquid polyol comprising at least 30% by weight (based on the total weight of the polyol) of a coupled polyol which may contain induced unsaturation. These pre-formed stabilizers can be used to prepare polymer polyols which are stable and have a narrow particle size distribution. The coupled polyol is necessary to achieve a small particle size in the pre-formed stabilizer, which preferably ranges from 0.1 to 0.7 micron. U.S. Pat. Nos. 6,013,731 and 5,990,185 also disclose pre-formed stabilizer compositions comprising the reaction product of a polyol, a macromere, at least one ethylenically unsaturated monomer, and a free radical polymerization initiator.

It is known that large, bulky molecules are effective macromeres because less material can be used to sterically stabilize the particles. See, for example, EP 0786480. Generally speaking, this is due to the fact that a highly branched polymer has a considerably larger excluded volume than a linear molecule (such as, e.g., a monol), and therefore less of the branched polymer is required. U.S. Pat. No. 5,196,476 discloses that functionalities of 2 and higher, and preferably 3 and higher, are suitable to prepare macromeres.

Macromeres based on multi-functional polyols and which have multiple sites of reactive unsaturation are described in U.S. Pat. No. 5,196,476. As described therein, there is an upper limit to the concentration of unsaturation when making macromeres by the maleic anhydride route. If the ratio of moles of unsaturation per mole of polyol is too high, then there is a higher probability that species will be formed which have more than one double bond per molecule. Typically, the '476 patent employs from about 0.5 to about 1.5 moles, and preferably from about 0.7 to about 1.1 moles, of the reactive unsaturated compounds for each mole of the alkoxylated polyol adduct.

As explained above, preformed stabilizers (PFS) are in principle known in the art for processes to form a dispersion by radical polymerization. However, the requirements for stabilizers to be used in the melt emulsification process are different (even though the manufacturing of the stabilizers may be similar).

The melt emulsification process involves only physical mixing of the components, rather than a chemical reaction. In the conventional methods (radical polymerization), the PFS or macromeres are added during the radical polymerization. Thus, the residence times are different, and there is no post-polymerization or further polymer chain growth in the melt emulsification process.

Furthermore, it is assumed that the inventive stabilizers preferably contain comb-like structured polyols CSP. These polyols CSP are assumed to have a backbone formed of styrene/acrylonitrile (SAN) polymer which interacts with the SAN contained in the polymer polyol product to be stabilized. Moreover, the macromeres used for synthesizing the inventive stabilizer usually have functional groups that are assumed to interact with the polyols of the polymer polyol product to be stabilized and can reaction with the isocyanate during the PU reaction. This process improves the integration of graft particles in the PU network.

The inventive stabilizers usually have a viscosity in the range between 1000 to 100000 mPas, preferably 5000 to 80000 mPas, more preferably 8000 to 60000 mPas at 25° C. The inventive stabilizers usually have an OH number of 1 to 100, preferably 1 to 50 mg KOH/g, more preferentially 10 to 40 mg KOH/g.

The hydroxyl number is determined in accordance with DIN 53240 from 2012 (DIN="Deutsche lndustrienorm", i. e. German industry standard).

The viscosity of the polyols is, unless indicated otherwise, determined at 25° C. in accordance with DIN EN ISO 3219 from 1994 by means of a Rheotec RC20 rotational viscometer using the spindle CC 25 DIN (spindle diameter: 12.5 mm; internal diameter of measuring cylinder: 13.56 mm), however at a shear rate of 100/1s (instead of 50/1s).

In a preferred embodiment of the inventive stabilizer, the ratio of styrene to acrylonitrile is greater than 1:1, preferentially greater 1:1.5, most preferred greater 1:2.

The synthesis of the inventive stabilizers (S) described herein is usually carried out by reacting a macromere or a mixture of macromeres with styrene and acrylonitrile in a carrier polyol (P2) in the presence of a radical initiator and optionally a chain transfer agent in a free radical polymerization. This reaction is usually carried out in a semi-batch process; however a batch procedure or a continuous process is also possible. The monomers, the macromere or the macromere mixture, the carrier polyol, the initiator or the chain transfer agent can be added to the reactor before, during or after the reaction, continuously or stepwise.

Different radical initiators can be used, for example azoderivatioves, such as AIBN, peroxides such as tert-amyl peroxides, hydroperoxides and percarbonates. Most preferred are azodervivatives, in particular AIBN (azoisobutyro nitrile) and/or Dimethyl 2,2'-azobis(2-methylpropionate).

The inventive stabilizers may be used to stabilise polymer polyol dispersions, in particular polymer polyol dispersions produced by melt emulsification.

In a preferred embodiment, the obtained polymer polyol dispersion when using the inventive stabilizer has a solid content of 10% to 50%, preferably 30% to 46%, a viscosity of 1000 to 20000 mPas, preferably 3000 to 15000 mPas, more preferably 5000 to 12000 mPas at 25° C. and a shear rate of 100 1/s.

In order to determine the solid content, a polymer polyol sample is added into a centrifugal tube where it is diluted with solvent and fully shaken up; the mixture is centrifugally separated on a high-speed centrifuge, and the supernatant will be removed from the centrifugal tube by pouring; the whole process mentioned above will be repeated at least twice, and then the centrifugal tube filled with sample is put into a vacuum oven for drying; after it is cooled down to the room temperature, solid remained in the centrifugal tube will be weighed to calculate the solid content in the sample.

The inventive stabilizers preferably have a particle size D50 smaller than 0.5 μm, more preferentially smaller than 0.3 μm (as determined by static laser diffraction using a Mastersizer 2000 (Malvern Instruments Ltd) after dilution of the sample with isopropanol in order to obtain an optical concentration suitable for the measurement. For the dispersion of the sample a dispersing module Hydro SM was used with a stirrer speed of 2500 rpm. The calculation of the particle size distribution may be performed by the Mastersizer 2000 using Fraunhofer theory.)

Synthesis of Macromeres:

A macromere is defined as a molecule which comprises one or more polymerizable double bonds able to copolymerize with vinylic monomers such as styrene and acrylonitrile and which comprises one or more hydroxyl-terminated polyether chains. Typical macromeres comprise polyether polyols having an unsaturated group, which are commonly manufactured by reacting a standard polyether polyol with an organic compound containing an unsaturated group and a carboxyl, anhydride, isocyanate, epoxy or other functional group able to react with active hydrogen-containing groups. The group of useful isocyanates comprises isocyanato ethyl methylacrylate (IEM) and 1,1-dimethyl meta isopropenyl benzyl isocyanat (TMI).

In a preferred embodiment of this invention, TMI is used for manufacturing the macromere. Usually, macromeres are synthesized in the presence of Lewis acid catalysts.

The suitable Lewis acid catalysts generally comprise tin-based, boron-based, aluminum-based, gallium-based, rare earth-based, zinc-based, or titanium-based compounds. Representative tin-based compounds include: Dibutyltin diacetate, Dibutyltin dibromide, Dibutyltin dichloride, Dibutyltin dilaurate, Dibutyltin dimethoxide, Dibutyltin oxide, Dimethyltin diacetate, Dimethyltin dibromide, Diphenyltin dichloride, Diphenyltin oxide, Methyltin trichloride, Phenyltin trichloride, Tin(IV) acetate, Tin(IV) bromide, Tin(IV) chloride, Tin(IV) iodide, Tin(II) oxide, Tin(II) acetate, Tin(II) bromide, Tin(II) chloride, Tin(II) iodide, and Tin(II) 2-ethylhexanoate (stannous octoate). Representative boron-based compounds include: Boron tribromide, Boron trichloride, Boron trifluoride, and tris(pentafluorophenyl)borane. Representative aluminum-based compounds include: Aluminum chloride and ~luminum bromide. Representative gallium-based compounds include: Gallium chloride, Gallium bromide, and Gallium(III) actylacetonate.

Representative rare earth catalysts are generally salts of Scandium, Yttrium, Lanthanum, Praseodymium, Neodymium, Erbium, Thulium, Ytterbium, Neodymium or Lutetium. Examples include: Ytterbium triflate, Ytterbium (III) actylacetonate, Erbium(III) trifluorosulfonate (erbium triflate), Erbium(III) actylacetonate, Holmium triflate, Terbium triflate, Europium triflate, Europium(III) trifluroacetate, Samarium triflate, Neodymium triflate, Neodymium (III) actylacetonate, Praseodymium triflate, Lanthanum triflate, and Dysprosium triflate. Representative zinc-based compounds include Zinc chloride and Zinc bromide. Representative titanium compounds include Titanium(IV) bromide and Titanium(IV) chloride.

A number of methods for inducing reactive unsaturation into a polyol are known in the art. The synthesis of useful macromeres is described in WO2005/003200. Macromere A is a product obtained by reaction of a three-functional polyether polyol with 1,1-Dimethyl meta-isopropenyl benzyl isocyanate (TMI). Macromere B is a product obtained by reaction of a six-functional polyether polyol with 1,1-Dimethyl meta-isopropenyl benzyl isocyanate (TMI).

The molecular weight of a polyol in general may be calculated by the following formula: $Mn=f \times 56100/OH$-value, wherein $Mn$=number average molecular weight in g/mol, f=functionality, the number of OH groups per molecule, determined by the starter used to synthesize the macromere, OH-value=hydroxyl number of oligo-polyol in mg KOH/g.

The polymer polyol dispersion stabilized by using at least one inventive stabilizer may be used for the production of polyurethanes (PU).

Usually, in the production of polyurethanes, at least one polyol is reacted with at least one poly- or isocyanate, optionally in the presence of at least one blowing agent and/or catalyst.

A typical A-component in this PU production process consists of one or more polyols, one or more polyurethane catalysts, one or more surfactants, one or more crosslinkers, water or optionally other chemical or physical blowing agents. The B-component usually contains the isocyanates.

In another embodiment of the present invention, the polymer polyol comprising the inventive stabilizer may also be used to obtain a stable A-component in a PU production process, such that the A-component may be stored for a prolonged time without phase separation.

EXAMPLES

In the following sections, some experimental examples are given in order to illustrate some aspects of the present invention.

General Procedure for Synthesizing a Stabilizer:

A glass reactor was charged with a carrier polyol, optionally already in the beginning a macromere or a mixture of macromeres, optionally acrylonitrile, optionally styrene, optionally a chain transfer agent and heated to 125° C. A mixture of carrier polyol, initiator, styrene, acrylonitrile and macromere or a mixture of macromeres were added over 100 minutes. The reaction mixture was stirred for another 20 minutes at 125° C. The mixture was subsequently evacuated under reduced pressure for 120 minutes at 125° C. to remove residual monomers. The obtained stabilizers were characterized and used without further purification.

The composition of representative stabilizers obtained by this procedure are shown in table x. All amounts are given in weight %. All experiment were carried out by using 0.5 weight % of azo initiator (Dimethyl 2,2'-azobis(2-methylpropionate) and 0.4% of a thiol containing chain transfer agent. The weight percentages given in this section refer to the final product (i. e. the stabilizer).

TABLE 1

| experiment No. | styrene in weight % | acrylonitrile in weight %. | macromere A in weight % | macromere B in weight % | carrier Polyo, in weight % | OH-value in mg KOH/g | viscosity in mPas |
|---|---|---|---|---|---|---|---|
| 1 | 7.8 | 4.2 | 50 | 0 | 37 | 25.3 | 14990 |
| 2 | 5.5 | 4 | 0 | 41 | 48.5 | 25.1 | 9913 |
| 3 | 17.3 | 8.8 | 0 | 42 | 31.3 | 20.4 | 39400 |
| 4 | 3.64 | 1.86 | 56.64 | 0 | 37.28 | 23.2 | 9040 |
| 5 | 7.8 | 4.2 | 32 | 16 | 39 | 23.7 | 25345 |
| 6 | 10.3 | 5.5 | 42.2 | 21.1 | 19.8 | 46.7 | Viscosity not measurable at RT, 18285 @ 75° C. |
| 7 | 7.8 | 4.2 | 16 | 0 | 70 | 29.8 | 2300 |

The residual portion (rest when adding up to 100% by weight) is made up of the initiator(s) and the chain transfer agent(s).

Production of Polyol Dispersion:

The following dispersions were obtained by using commercially available styrene-acrylonitrile copolymer types with different compositions of styrene and acrylonitrile. For example Starex® types from Samsung, Luran® types from Styrolution, Lustran® types from Ineos can be used. A round bottom-flasked equipped with a stirrer and a nitrogen inlet was charged with 200 g of the SAN type given in table x and 50 g of the selected stabilizer and heated to 245° C. under nitrogen atmosphere. The mixture was stirred for 15 minutes at this temperature. Lupranol® 2095 was heated to 245° C. and added with vigorous stirring. The mixture was stirred for additional 30 minutes after addition and then cooled to RT. The particle size was determined by light scattering as described before. The particle size is used as an indicator for the efficiency of the stabilizer system.

| Dispersion No. | Stabilizer No. | SAN composition Styrene to acrylonitrile (weight ratio) | particle size D50 in Micrometer |
|---|---|---|---|
| 1 | 1 | 65/35 | 1.9 |
| 2 | 1 | 76/24 | 3.7 |
| 3 | 2 | 65/35 | 2.5 |
| 4 | 3 | 65/35 | 140.4 |
| 5 | 4 | 65/35 | 27.7 |
| 6 | 5 | 65/35 | 2.18 |
| 7 | 5 | 76/24 | 2.2 |
| 8 | 7 | 65/35 | No phase stable product obtained → insufficient stabilization |

Examples 1 to 3 in comparison to example 4 show that the ratio between, styrene, acrylonitrile, macromere or macromere mixtures and carrier polyol which was used for the synthesis of the stabilizers is important for efficient stabilization of the produced dispersions. Stabilizer 3 used in example 4 shows that a high amount of styrene and acrylonitrile which was used to produce the stabilizers leads to ineffective stabilization of the dispersions obtained with these products. Example 5 which used stabilizer 4 and example 8 which uses stabilizer 7 shows that the amount of used macromere is critical to obtain efficient stabilizer systems.

The ratio between the monomers styrene and acrylonitrile which were used to produce the stabilizer does not necessarily have to match the ratio of the used SAN material to obtain stable dispersion. The stabilizer used in example 2 and 7 had a styrene to acrylonitrile ratio of 1.86 to 1, the SAN used as a dispersed phase had a composition of 3.16 to 1. In both cases very stable dispersion with small particle sizes could be obtained. Stabilizer 6 could not be used to prepare dispersion because of the high viscosity of this stabilizer. Handling of these highly viscous stabilizers under normal conditions is not possible.

The invention claimed is:

1. A process for producing a polymer polyol dispersion by melt emulsification, the process comprising:
   physically mixing a polymer melt and a polyol in the presence of a stabilizer (S),
   wherein the stabilizer (S) comprises, based on the total weight of the stabilizer (S):
      from 10 to 59 wt % of a polyether polyol P2 having a number average molecular weight, Mn, of 1,000-6,000 g/mol; and
      a polyol CSP consisting of, in reacted form, a macromere M, styrene, acrylonitrile, optionally an initiator, and optionally a chain transfer agent, wherein the macromere M, styrene, acrylonitrile, optional initiator, and optional chain transfer agent are reacted in the presence of the polyol P2, to obtain the polyol CSP,
   wherein the content of macromere M in the stabilizer (S) is between 35 to 54 wt %, based on the total weight of the stabilizer (S),
   wherein the content of styrene in the stabilizer (S) is between 4 to 15 wt %, based on the total weight of the stabilizer (S),
   wherein the content of acrylonitrile in the stabilizer (S) is between 2 to 7 wt %, based on the total weight of the stabilizer (S),
   wherein the macromere M is obtained by reacting 1,1-dimethyl meta isopropenyl benzyl isocyanate (TMI) with a polyether polyol PM, optionally in the presence of a Lewis acid catalyst, and
   wherein the stabilizer (S) comprises no additional solvent.

2. The process according to claim 1, wherein the stabilizer (S) consists of:
   one or two polyols P2; and
   one or two polyols CSP,
   wherein the initiator is selected from the group consisting of azo initiators and peroxide initiators and/or wherein the chain transfer agent is selected from the group consisting of dodecane thiol, isopropanol, and 2-butanol.

3. The process according to claim 1, wherein the stabilizer (S) consists of:
one or two polyols P2; and
one or two polyols CSP.

4. The process according to claim 1, wherein the macromere M has a number average molecular weight, Mn, of from 1000 to 50000 g/mol.

5. The process according to claim 1, wherein the macromere M has from 0.2 to 1.2 polymerizable ethylenically unsaturated groups per molecule in average and/or from 2 to 8 hydroxyl groups per molecule.

6. The process according to claim 1, wherein the polyether polyol PM is selected from the group consisting of three- and six-functional polyether polyols.

7. The process according to claim 1, wherein the weight ratio of styrene to acrylonitrile in the stabilizer (S) is greater than 1:1.

8. The process according to claim 1, wherein the viscosity of the stabilizer (S) is between 1000 and 100000 mPas at 25° C., determined according to DIN EN ISO 3219 and a shear rate of 100 1/s.

9. The process according to claim 1, wherein the content of polyol P2 of the stabilizer (S) is 20 to 59 wt %.

10. The process according to claim 1, wherein the polymer melt is styrene acrylonitrile copolymer.

11. The process according to claim 1, wherein the stabilizer (S) is present in the polymer melt before physically mixing the polymer melt and the polyol.

12. The process according to claim 1, further comprising:
melting a styrene acrylonitrile copolymer, to obtain the polymer melt;
adding the polyol to the polymer melt; and
blending the polymer melt and the polyol under shear,
wherein the stabilizer (S) is present during the adding and/or the blending.

13. The process according to claim 1, wherein the solid content of the obtained polymer polyol dispersion is from 10% by weight to 50% by weight and/or the viscosity of the obtained dispersion is 1000 to 20000 mPas at 25° C.

* * * * *

UNITED STATES PATENT AND TRADEMARK OFFICE
CERTIFICATE OF CORRECTION

PATENT NO. : 10,472,458 B2
APPLICATION NO. : 15/307242
DATED : November 12, 2019
INVENTOR(S) : Christian Koenig et al.

It is certified that error appears in the above-identified patent and that said Letters Patent is hereby corrected as shown below:

In the Specification

Column 2, Line 33, "structured" should read -- structured. --;

Column 3, Line 24, "obttained." should read -- obtained. --;

Column 3, Line 30, "thylenically" should read -- ethylenically --;

Column 4, Line 58, "azoderivatioves," should read -- azoderivatives, --;

Column 4, Line 58, "AlBN," should read -- AIBN, --;

Column 4, Line 60, "azoderivatioves," should read -- azoderivatives, --;

Column 4, Line 60, "AlBN" should read -- AIBN --;

Column 5, Line 35, "unsatured" should read -- unsaturated --;

Column 5, Line 39, "isocyanat" should read -- isocyanate --;

Column 5, Line 60, "~luminum" should read -- aluminum --;

Column 7, Line 3, Table 1, "Polyo," should read -- Polyol, --.

Signed and Sealed this
Eleventh Day of August, 2020

Andrei Iancu
*Director of the United States Patent and Trademark Office*